US006645609B2

(12) United States Patent
Sperlich et al.

(10) Patent No.: US 6,645,609 B2
(45) Date of Patent: Nov. 11, 2003

(54) PEELABLE, SEALABLE POLYOLEFINIC MULTILAYERED FILM AND ITS USE AS A PACKAGING FILM

(75) Inventors: Bernd Sperlich, Walsrode (DE); Helmut Wagner, Bomlitz (DE); Willi Schwarz, Bomlitz (DE); Hans Wunderlich, Bomlitz (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

(21) Appl. No.: 09/881,227

(22) Filed: Jun. 13, 2001

(65) Prior Publication Data
US 2002/0022125 A1 Feb. 21, 2002

(30) Foreign Application Priority Data
Jun. 23, 2000 (DE) .......................... 100 30 879

(51) Int. Cl.⁷ ............................. B32B 7/02; B32B 27/08; B32B 27/32
(52) U.S. Cl. .................. 428/216; 428/215; 428/336; 428/516; 428/520; 428/910
(58) Field of Search ................... 428/516, 332, 428/336, 520, 910, 213, 215, 216

(56) References Cited

U.S. PATENT DOCUMENTS

| 4,666,778 | A | | 5/1987 | Hwo ........................ 428/412 |
| 5,629,059 | A | * | 5/1997 | Desai et al. ................ 428/34.9 |
| 5,716,698 | A | | 2/1998 | Schreck et al. ............. 428/323 |
| 6,074,715 | A | * | 6/2000 | Lind et al. ................. 428/35.4 |
| 6,110,570 | A | * | 8/2000 | Paleari et al. .............. 428/213 |
| 6,436,496 | B1 | * | 8/2002 | Rackovan et al. ......... 428/34.9 |

* cited by examiner

Primary Examiner—D. S. Nakarani
(74) Attorney, Agent, or Firm—Godfried R. Akorli; Diderico van Eyl

(57) ABSTRACT

Described is a stretched multilayered film comprising: (a) a polyolefin layer; and (b) at least one peelable outer layer. Each peelable outer layer (b) independently is 0.5 to 5 $\mu$m thick, comprises a copolymer of vinyl acetate and ethylene, and has a vinyl acetate proportion of from 3 to 30 wt. %, based on the weight of the peelable outer layer (b). Also described is a method of using the multilayered film as a packaging film.

10 Claims, No Drawings

PEELABLE, SEALABLE POLYOLEFINIC MULTILAYERED FILM AND ITS USE AS A PACKAGING FILM

CROSS REFERENCE TO RELATED PATENT APPLICATION

The present patent application claims the right of priority under 35 U.S.C. §119 (a)–(d) of German Patent Application No. 100 30 879.1, filed Jun. 23, 2000.

FIELD OF THE INVENTION

The present invention provides stretched polyolefin multilayered films with at least one peelable outer layer.

BACKGROUND OF THE INVENTION

Heat sealed joints in stretched polyolefin films, in particular biaxially oriented (i.e., stretched) polypropylene films, often have greater mechanical strength than the film itself, so that on opening a sealed package not only is the heat sealed joint ripped apart but the entire film tears in an uncrontrollable manner. For this reason, peelable heat sealing layers are used which, on the one hand, have good sealing properties and, on the other hand, facilitate controlled opening of a package. An important feature of this type of peelable heat sealing layer is that this behavior occurs over as wide a range of temperature as possible for the heat-sealing mould and that the strength of the heat sealed joint is as constant as possible over this temperature range. This means that the strength of the heat sealed joint in the case of stretched polyolefin films should not be too high because these films have a very low tear propagation resistance and tear in an uncontrolled manner when subjected to even a very small degree of damage.

U.S. Pat. No. 4,666,778 describes transparent, peelable films with a high heat sealed joint strength. The peelable layers have a thickness of 40 $\mu$m and more. Such thick heat sealed layers are a disadvantage for oriented polyolefin films because these are then used for many applications where the use of thin films is no longer appropriate.

EP-A-0 692 373 describes a peelable film with incompatible polymers in the peelable outer layer. However, this makes the film cloudy which is a disadvantage for many applications.

SUMMARY OF THE INVENTION

Thus, there is the object of providing a stretched polyolefin multilayered film which is peelable after being heat sealed at a variety of temperatures and therefore has a wide peeling range. In addition, the film must have as constant a heat sealed joint strength as possible over this peeling range.

In accordance with the present invention, there is provided a stretched multilayered film comprising:

(a) a polyolefin layer; and (b) at least one peelable outer (or skin) layer, wherein each peelable outer layer (b) independently is 0.5 to 5 $\mu$m thick, comprises a copolymer of vinyl acetate and ethylene, and has a vinyl acetate proportion of from 3 to 30 wt. %, based on the weight of said peelable outer layer (b). In an embodiment of the present invention, the peelable outer layer (b) is in contact with said polyolefin layer (a).

Other than in the operating examples, or where otherwise indicated, all numbers expressing quantities of ingredients, reaction conditions, etc. used in the specification and claims are to be under stood as modified in all instance by the term "about."

DETAILED DESCRIPTION OF THE INVENTION

The film according to the present invention is at least two-layered and always includes, as essential layers, the polyolefin layer (a) and at least one peelable outer layer (b), preferably two outer layers (one on each face of the polyolefin layer (a)), each of which may be identical or different in thickness and/or composition. In the case of a three-layered film and having a single outer layer (b) on one side, the layer located on the opposite face from this outer layer is preferably a heat sealable, non-peelable outer layer (c). From among the many materials which can be used for sealable, non-peelable layers, the following are preferably used in the present invention:

statistic propylene/ethylene copolymers
statistic propylene/olefin copolymers
statistic propylene/ethylene/olefin terpolymers
mixtures of two or three of the preceding polymers.

Particularly preferred as the heat sealable, non-peelable outer layer (c) is a propylene/ethylene copolymer characterised in that it contains 1.0 to 10 wt. % of ethylene, based on the weight of the propylene/ethylene copolymer. The density of the heat sealing layer polymers are preferably in the range 0.895 to 0.960 g/cm$^3$, and the crystallite melting point, depending on the particular type, is in the range 125 to 148° C.

The total thickness of the multilayered film of the present invention may vary between wide limits. The multilayered film according to the invention typically has a total thickness of 5 to 200 $\mu$m, preferably 10 to 100 $\mu$m, and more preferably 15 to 40 $\mu$m. The thickness of each peelable outer layer (b) independently is preferably in the range 0.5 to 5 $\mu$m, in particular 0.6 to 2 $\mu$m, wherein the density and composition of each outer layer (b) applied to the two faces of the polyolefin layer (a) may be identical or different.

The polyolefin layer (a) preferably consists substantially or entirely of a polypropylene homopolymer. An isotactic polypropylene homopolymer with a density of 0.90 to 0.91 g/cm$^3$ and a melt flow index of 1 to 4 g/10 min at 230° C./21.6 N (according to DIN 53 735) is preferably used.

The multilayered film of the present invention may optionally contain lubricants and antistatic additives. Classes of lubricants that may be used include higher molecular weight aliphatic acid amides, higher molecular weight aliphatic esters, waxes and metal soaps and also polydimethylsiloxanes. The active amount of lubricants used is typically in the range 0.01 to 3 wt. %, and preferably 0.02 to 1 wt. %, based on the weight of the multilayered film. The addition of higher molecular weight aliphatic acid amides in the range 0.01 to 0.25 wt. %, based on the weight of the multilayered film, is particularly suitable. A particularly suitable aliphatic acid amide is erucic amide.

Preferred antistatic additives include, but are not limited to: alkali metal alkanesulfonates; polyether-modified (i.e., ethoxylated and/or propoxylated); polydiorganosiloxanes (e.g., polydialkylsiloxanes, polyalkylphenylsiloxanes and the like); and/or substantially straight-chain and saturated aliphatic tertiary amines with an aliphatic group having 10 to 20 carbon atoms, which are substituted with ω-hydroxy-(C$_1$–C$_4$)-alkyl groups. Of the tertiary amines, N,N-bis-(2-hydroxyethyl)-alkylamines with 10 to 20 carbon atoms, preferably 12 to 18 carbon atoms in the alkyl group are particularly suitable. The active amount of antistatic agent is typically in the range 0.05 to 0.5 wt. %, based on the weight of the multilayered film. Furthermore, glycerine monostearate is also suitable as an antistatic agent, and is typically used in an amount of 0.03 % to 0.5 wt. %, based on the weight of the multilayered film.

The peelable outer layer (b) and optional heat-sealable, non-peelable outer layer (c) each preferably and independently contain 0.02 to 1.0 wt. %, and particularly preferably 0.05 to 0.2 wt. %, of antiblocking agent, the wt. %'s being based on the weight of each outer layer. Suitable antiblocking agents include, but are not limited to: inorganic additives such as silicon dioxide, calcium carbonate, magnesium silicate, aluminum silicate, calcium phosphate and the like; and/or cross-linked polymer particles such as, cross-linked polymethacrylates or cross-linked polyalkylsiloxanes; and/or incompatible organic polymers, such as polyamides, polyacrylates, polymethacrylates, polyesters, polycarbonates and the like. Silicon dioxide is a preferred antiblocking additive. In the case of particulate antiblocking agents, the average particle size is typically between 1 and 10 μm, and in particular between 2 and 5 μm.

In a preferred embodiment of the present invention, the peelable outer layer (b) comprises a mixture of an ethylene/vinyl acetate copolymer and a second polymer (e.g., a polyethylene polymer), wherein the ethylene/vinyl acetate copolymer has a vinyl acetate content of 5 to 30 wt. %, based on the weight of the ethylene/vinyl acetate copolymer, and a melt flow index (MFI) of between 1 and 30 g/10 min (ASTM D 1238).

The ethylene/vinyl acetate copolymer of the peelable outer layer (b) is typically admixed with the second polymer in such a way that the vinyl acetate content of the peelable outer layer (b) is from 3 and 25 wt. %, based on the weight of the peelable outer layer (b). The second polymer in this case preferably consists of ethylene sequences. Examples of polyethylene polymers from which the second polymer of the peelable outer layer (b) may be selected include, but are not limited to, HDPE, MDPE, LDPE, LLDPE, VLDPE. These polyethylene polymers may contain a small proportion of comonomers, typically in amounts of less than 10 wt. %, and preferably 1 to 8 wt. %, based on the weight of the polyethylene polymer. These comonomers are olefins with 3 to 10 carbon atoms, of which propene, 1-butene and/or 1-hexene are preferred.

In another preferred embodiment of the present invention, the peelable outer layer (b) consists substantially of an ethylene/vinyl acetate copolymer having a vinyl acetate content of from 3 to 25 wt. %, based on the weight of the ethylene/vinyl acetate copolymer, and a MFI between 1 and 30 g/10 min (ASTM D 1238). The total VA-content of layer (b) is always 3 to 25 wt. %. This can be achieved by using a ethylene/vinylacetate copolymer or a mixture of an ethylene/vinylacetate copolymer with a polyethylene polymer.

Multilayered films according to the invention may be prepared by conventional processes, such as lamination, coating or melt coextrusion. After extrusion and solidification of the unstretched multilayered film (thick film) on the casting roll, the multilayered film is stretched (i.e., oriented) in the direction of run (longitudinally) with a stretching quotient of 4/1 to 7/1 at a temperature of 120° C.–150° C. The stretching ratio in the transverse direction is preferably between 8/1 and 12/1, and transverse stretching of the film is performed at a temperature between 130° C. and 170° C. In an embodiment of the present invention, the polyolefin layer (a), and the outer layer(s) (b) and optionally (c) are biaxially stretched (oriented). In a further embodiment of the present invention, the polyolefin layer (a) is biaxially stretched (oriented), and the outer layer(s) (a) and optionally (c) are monoaxially stretched (oriented).

In order to ensure affinity of the largely non-polar film surface to printing inks, under some circumstances the multilayered film may be subjected to corona (or spray) pre-treatment. During the corona pre-treatment, oxygen from the air is typically incorporated on the surface of the multilayered film in the form of carbonyl, epoxide, ether or alcohol groups. Other methods of pre-treating the multilayered films of the present invention, include, for example, flame, plasma and fluorine pre-treatment.

The multilayered films according to the invention are characterised as having good peeling properties. The heat sealed joint strength of the multilayered film (determined in accordance with the method as described in the Examples herein) remains constant over a large temperature range, which provides a wide processing window for packaging machines through which the multilayered film may be run. At the same time, the multilayered films have a low heat sealing temperature, which means that even heat-sensitive foodstuffs can be carefully packaged. Surprisingly, it was found that the peelable outer layer of the multilayered films according to the invention seal not only against themselves but also seal against surfaces made of conventional heat sealing materials, such as copolymers of propylene and ethylene, and also that these seals are peelable.

The invention also provides a method of using the multilayered films of the present invention as packaging films, e.g., as packaging films for foodstuffs.

EXAMPLES

Test Methods:

The heat sealed joint strength was determined in accordance with the following method. For this determination, two 15 mm wide strips were laid one over the other and heat sealed at the particular temperature for a sealing time of 0.5 sec at a sealing pressure of 50 N/cm$^2$. Then the force required to separate the heat sealed joint was measured.

The two outer layers of the multilayered films of Examples 1–4 (having the compositions as summarized in Table 1) were applied to a monoaxially stretched base film of polypropylene having a density of 0.91 g/cm$^3$ and a melt flow index of 3.0 g/10 min at 230° C./21.6 N. The multilayered films of the Examples were then stretched so that a multilayered film having a longitudinal stretch ratio 5:1, and a transverse stretch ratio 10:1 was obtained.

Each multilayered film had a thickness of 25 μm, and the two outer layers each had a thickness of 1 μm.

TABLE 1

| Example | Constituents in 1st outer layer[1] | Constituents in 2nd outer layer[1] |
|---|---|---|
| 1 | 99% ethylene/vinyl acetate copolymer[2] | 99% ethylene/vinyl acetate copolymer[2] |
| 2 | 99% ethylene/vinyl acetate copolymer[2] | 99% propylene/ethylene copolymer[3] |
| 3 | 50% LDPE[4] 49% ethylene/vinyl acetate copolymer[5] | 50% LDPE 49% ethylene/vinyl acetate copolymer[5] |
| 4 (comp. example) | 99% propylene/ethylene copolymer[3] | 99% propylene/ethylene copolymer[3] |

[1]Apart from the constituents specified in the table, the outer layers each contain 0.3 wt. % N,N-bis-(2-hydroxyethyl)-($C_{12}$—$C_{16}$)-alkylamine, 0.6 wt. % of a polydimethylsiloxane with density 0.985 g/cm$^3$ at 20° C. and a viscosity of 10$^6$ mPas and 0.1 wt. % silicon dioxide with an average particle size of 4 μm.
[2]5 wt. % vinyl acetate monomer content, based on the weight of the ethylene/vinyl acetate copolymer, MFI = 7.5 g/10 min (ASTM D 1238), density: 0.925 g/cm$^3$.
[3]4.5 wt. % ethylene monomer content, based on the weight of the propylene/ethylene copolymer, MFI = 5 g/10 min (230° C./2, 16 kp/cm$^2$), density: 0.90 g/cm$^3$.
[4]MFI = 7.5 g/10 min (ASTM D 1238); density: 0.9155 g/cm$^3$.
[5]20 wt. % vinyl acetate monomer content, based on the weight of the ethylene/vinyl acetate copolymer, MFI = 20 g/10 min (ASTM D 1238), density: 0.940 g/cm$^3$.
[6]Film according to at least one of the preceding Claims, characterised in that it is used for packaging purposes.

TABLE 2

| Example | Heat sealed joint strength in N/15 mm at the following sealing temperature | | | | | |
|---|---|---|---|---|---|---|
| | 90° C. | 100° C. | 110° C. | 120° C. | 130° C. | 140° C. |
| 1 | 0.1 (peelable) | 0.6 (peelable) | 0.6 (peelable) | 0.7 (peelable) | 0.7 (peelable) | 0.7 (peelable) |
| 2 | 0 (peelable) | 0 (peelable) | 0 (peelable) | 0.5 (peelable) | 0.6 (peelable) | 0.5 (peelable) |
| 3 | 0.7 (peelable) | 0.7 (peelable) | 0.7 (peelable) | 0.7 (peelable) | 0.6 (peelable) | 0.7 (peelable) |
| 4 (Comp. example) | 0 | 0 | 0.3 (peelable) | 2.5 (film tears) | 2.7 (film tears) | 2.7 (film tears) |

Peelable: The heat sealed film section can be separated mechanically without the film tearing in the process (when pulled apart slowly and also when jerked apart)
Film tears: The heat sealed film section cannot be separated mechanically without the film tearing in the process It is clear based on the data summarized in Table 2 that the heat sealed joint strength of Examples 1 to 3, compared to the comparison example 4, is approximately constant over a 20° C. to 40° C. range (between 0.6 and 0.7 N/15mm for Examples 1 and 3, and between 0.5 and 0.6 for Example 2), and in no case is the film damaged when the heat sealed joint is pulled apart. This indicates that the peeling behavior of the multilayered films of the present invention is very stable and reproducible, and that a wide processing window may be available to packaging machines through which the multilayered films are run.

Example 2 shows that when sealing against an outer layer made of a propylene/ethylene copolymer, peelable behavior can be observed. While in comparative Example 4 the heat sealed joint strength is already so high at 120° C. that the sealed film rips on opening the heat sealed joint, (here, the heat sealed joint strength is greater than the tearing strength of the film). In the case of Example 4, the film is peelable only at a temperature of 110° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stretched multilayered film consisting essentially of:
    (a) a core layer which consists of Polypropylene homopolymer, and
    (b) a peelable outer layer, and
    (i) a further outer layer selected from the group consisting of
        (b') a separate peelable outer layer, and
        (c) a heat-sealable, non-peelable outer layer, wherein each peelable outer layer (b) and (b') independently 0.5 to 5 $\mu$m thick, comprises a copolymer of vinyl acetate and ethylene, and has a vinyl acetate proportion of from 3 to 30 wt. %, based on the weight of each of peelable outer layer (b) and (b'), and said polypropylene layer (a) is interposed between said peelable outer layer (b) and said further outer layer (i).

2. The multilayered film of claim 1 wherein the peelable outer layers (b) and (b') each independently comprise a mixture of a polyethylene polymer, and said copolymer of vinyl acetate end ethylene.

3. The multilayered film of claim 2 wherein the copolymer of ethylene and vinyl acetate has a vinyl acetate proportion of from 5 to 30 wt. %, based on the weight of said copolymer of vinyl acetate and ethylene.

4. The multilayered film of claim 1 wherein the peelable outer layers (b) and (b') each consists of a copolymer of ethylene and vinyl acetate.

5. The multilayered film of claim 4 wherein the copolymer of ethylene and vinyl acetate has a vinyl acetate proportion of 3 to 25 wt. %, based on the weight of said copolymer of vinyl acetate and ethylene.

6. The multilayered film of claim 1 wherein the polypropylene layer (a) is biaxially stretched.

7. The multilayered film of claim 6 wherein said peelable outer layers (b) and (b) are each a monoaxially stretched layer consisting of a copolymer of vinyl acetate end ethylene.

8. The multilayered film of claim 1 wherein said a heat-sealable, non-peelable outer layer (c) comprises a polymer selected from group consisting of propylene/ethylene copolymers, propylene/olefin copolymers, propylene/ethylene/olefin terpolymers and mixtures thereof.

9. The multilayered film of claim 8 wherein said a heat-sealable, non-peelable outer layer (c) comprises a propylene/ethylene copolymer containing 1 to 10 wt. % of ethylene, based on the weight of the propylene/ethylene copolymer, said propylene/ethylene copolymer having a density of 0.895 to 0.960 g/cm$^3$, and a crystalline melting point of 125° C. to 148° C.

10. A method of using the multilayered film of claim 1 as a packaging film.

* * * * *